W. KRAISS.
Bee Hive.

No. 64,334. Patented April 30, 1867.

Witnesses:

Inventor:

United States Patent Office.

WILLIAM KRAISS, OF FAIR VIEW, PENNSYLVANIA, ASSIGNOR TO HIMSELF, JACOB BECKMAN, AND MYRON SILVERTHORN, OF THE SAME PLACE.

Letters Patent No. 64,334, dated April 30, 1867.

IMPROVEMENT IN BEE-HIVES.

The Schedule referred to in these Letters Patent and making part of the same.

TO ALL WHOM IT MAY CONCERN:

Be it known that I, WILLIAM KRAISS, of Fair View, in the county of Erie, and State of Pennsylvania, have invented certain new and useful improvements in Bee-Hives; and I do hereby declare that the following is a full and complete description of the construction of the same, reference being had to the accompanying drawings, making a part of this specification, in which—

Figure 3:
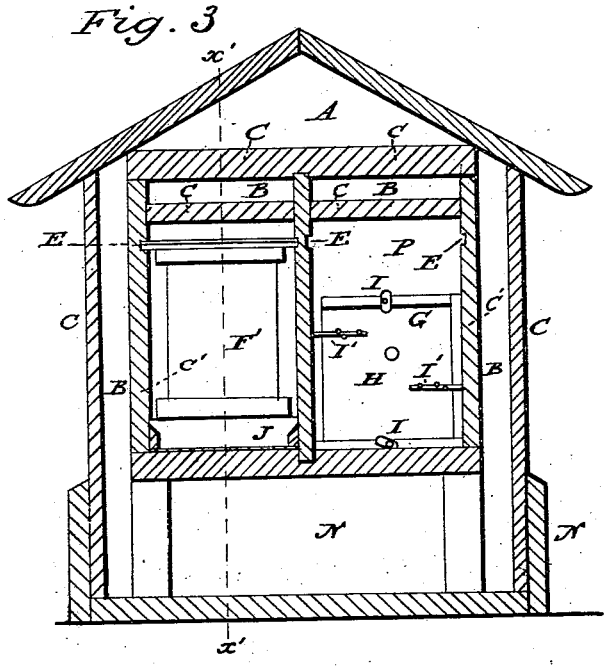
Figure 4:
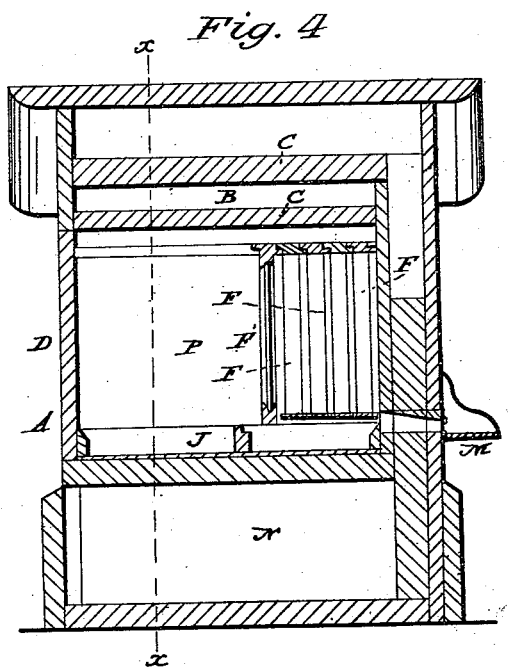

Figure 3, a transverse section in the direction of the line $x$ $x$ in fig. 4.

Figure 4 is longitudinal section in the direction of the line $x'$ $x'$, fig. 3.

Like letters of reference refer to like parts in the several views.

Figure 1:
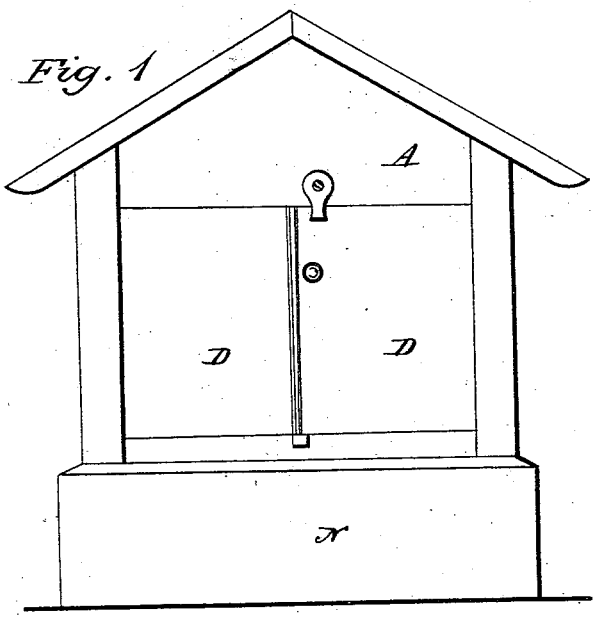
Figure 1 is a rear elevation.
Figure 2:
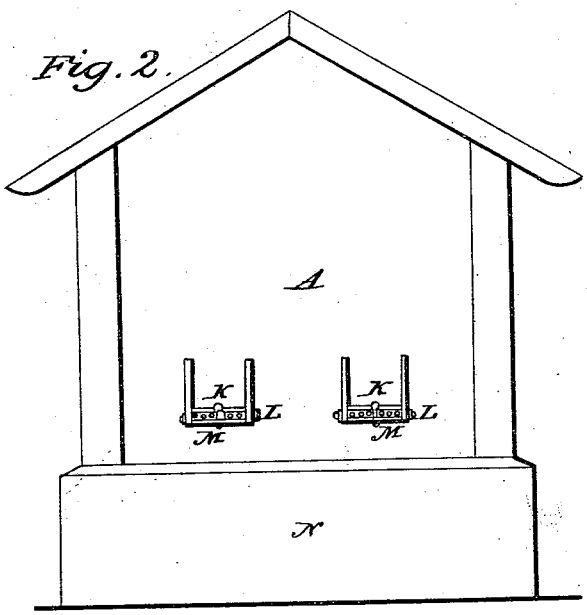
Figure 2 is a front elevation.

A, fig. 1, is the bee-house or hive, the outside of which may be constructed of wood, air-dried brick, or any other material of a suitable nature. The walls of this hive are double, leaving a space of four or five inches between the inner and outer walls, as shown in fig. 2. B the space; C C' the walls. This space is filled with sieved wood or coal ashes. D are doors at the back of the hive. E, fig. 3, are grooves cut along the upper side of the inner wall, and in which are hung the frames F, fig. 4; these frames are movable, and more or less in number, according to the strength of the colony. When the desired number are placed in the hive, a glass, F', is then hung between them and the doors, for the purpose of observing the labor and condition of the bees without disturbing them. G is a swarming-box, one end of which is opened, the other being fitted with a door, H, and is secured in place by the buttons I and slides I'. J, fig. 3, is a drawer placed under the frames, for the purpose of catching the droppings and dead bees as they fall, and can thereby be easily removed, and the hive kept clean. K, fig. 2, are the bee-doors, and each is provided with a slide, L, by the means of which the doors may be made larger or smaller, as circumstances may require. These slides are perforated with holes for the purpose of ventilation. M are the alighting-boards, and N the bench or base upon which the hive stands.

Of the many advantages of this hive we instance the following: The walls being double, and filled up in the manner above described, the hive is not so easily affected by the heat of summer or by the cold of winter; hence in the spring the queen may by a proper feeding be induced to lay eggs much earlier than in any other kind of hive, without danger to the early brood from the cold; it is also a sure protection against the bee moth making its way into the hive. By removing the frames from behind, the bees are less liable to be crushed and brushed off, which can hardly be avoided in taking the frames out from above. This form of hive admits of making a young colony in a much shorter time, and some weeks earlier than a young swarm can be expected in any other hive. By means of the swarming-box referred to, a young swarm can be easily put into the hive, by slipping it towards the four or six frames purposely left in, for the favor of the bees, then opening the front doors and gently closing the back ones, until the whole swarm is in.

It will be seen that this structure forms a combined hive and bee-house, and the chambers P, constituting the hive proper, may be multiplied in number more or less according to the number of swarms or the convenience of the apiarian. In this house we have shown two hives only; others may be of the same character, or so modified as to meet the wants of those using them. Honey-boxes may be used in this house instead of frames, if desirable, and can be removed and replaced with equal facility as in the ordinary box-hive.

What I claim as my improvement, and desire to secure by Letters Patent, is—

The arrangement of one or more hives, provided with chambers P, frame F, hiving-box H, drawer J, and external slides K, as described, in combination with an external bee-house or casing, in such manner as to leave the spaces A B N between the sides, flooring, and roof of the hive and the external casing thereof, filled with ashes or other poor conductor of heat, substantially as and for the purpose set forth.

WM. KRAISS.

Witnesses:
W. H. BURRIDGE,
J. HOLMES.